US 6,596,783 B2

(12) United States Patent
Nodono et al.

(10) Patent No.: US 6,596,783 B2
(45) Date of Patent: Jul. 22, 2003

(54) PROCESS FOR PRODUCING FOAMED RESIN ARTICLE

(75) Inventors: Mitsunori Nodono, Ibarki (JP); Ryuma Kuroda, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/094,801

(22) Filed: Mar. 12, 2002

(65) Prior Publication Data

US 2003/0027878 A1 Feb. 6, 2003

Related U.S. Application Data

(62) Division of application No. 09/536,802, filed on Mar. 28, 2000, now Pat. No. 6,399,667.

(30) Foreign Application Priority Data

Mar. 30, 1999 (JP) ............................................ 11-088635
Jul. 28, 1999 (JP) ............................................ 11-213588
Jul. 28, 1999 (JP) ............................................ 11-213589

(51) Int. Cl.[7] ................................. C08J 9/14; C08J 9/08
(52) U.S. Cl. ........................... 521/81; 521/79; 521/142; 521/143; 521/134
(58) Field of Search ........................... 521/79, 81, 142, 521/143, 134

(56) References Cited

U.S. PATENT DOCUMENTS

| 3,870,662 A | * | 3/1975 | Lundberg |
| 3,988,404 A | | 10/1976 | Orimo et al. |
| 4,940,736 A | * | 7/1990 | Alteepping et al. |
| 5,116,881 A | * | 5/1992 | Park et al. |
| 5,985,190 A | | 11/1999 | Harfmann |
| 6,231,942 B1 | * | 5/2001 | Blizard et al. |

FOREIGN PATENT DOCUMENTS

| EP | 0 632 095 A2 | 1/1995 |
| EP | 0 818 292 A2 | 1/1998 |
| EP | 0 934 974 A1 | 8/1999 |
| WO | WO 97/38048 | 10/1997 |
| WO | WO 99/60053 | 11/1999 |

OTHER PUBLICATIONS

J.S. Colton, "The Nucleation of Microcellular Foams in Semi–Crystalline Thermoplastics", Materials and Manufacturing Process, 4(2) 1989, pp. 252–262.
WPI Abstract of JP–58–189237 A.
WPI Abstract of JP–08–081590 A.
WPI Abstract of JP–08–11190 A.
WPI Abstract of JP–10–24436 A.

* cited by examiner

Primary Examiner—Morton Foelak
(74) Attorney, Agent, or Firm—Fitch, Even, Tabin & Flannery (57) ABSTRACT

The present invention provides a process for producing a foamed resin article, the process comprising:

a step (the first step) of impregnating any one crystalline thermoplastic resin or resin composition containing, as an elementary ingredient, a crystalline thermoplastic resin selected from a certain group, under an elevated pressure which is not lower than the critical pressure of a substance with which the selected crystalline thermoplastic resin or resin composition is to be impregnated, with a fluid of the substance, and a step (the second step) of releasing the resin or resin composition impregnated with the substance from the foregoing pressurized condition in a period of less than 10 seconds.

5 Claims, 3 Drawing Sheets

PROCESS FOR PRODUCING FOAMED RESIN ARTICLE

CROSS-REFERENCED APPLICATIONS

This application is a divisional of U.S. application U.S. application Ser. No. 09/536,802, filed Mar. 28, 2000 now U.S. Pat. No. 6,399,467.

BACKGROUND OF THE INVENTION

1. Field of the Invention

The present invention relates to a process for producing a foamed resin article and the like, particularly to a process for producing a foamed resin article having fine cells in a high cell density and the like.

2. Description of the Related Art

In recent years, a supercritical foaming technique wherein a foamed resin article having fine cells in a high cell density is produced by using an inert substance (carbon dioxide, nitrogen and the like) in a supercritical state has been developed [see, for example, Material & Manufacturing Process, 4 (2), 253–262 (1989) and U.S. Pat. No. 5,160,674]. Development of techniques by which higher cell densities can be achieved is still required, however.

SUMMARY OF THE INVENTION

The object of the present invention is to provide a process for producing a foamed resin article having fine cells in a higher cell density, and the like.

The present inventors have studied intensively on a process for producing a foamed resin article having fine cells in a higher cell density, and as a result, have found a process for producing a foamed resin article comprising two steps using a specific resin material can attain the above object and have accomplished the present invention.

That is, the present invention provides:

1. a process for producing a foamed resin article, the process comprising: a step (the first step) of impregnating any one crystalline thermoplastic resin or resin composition containing, as an elementary ingredient, a crystalline thermoplastic resin selected from ones listed below, under an elevated pressure which is not lower than the critical pressure of a substance with which the selected crystalline thermoplastic resin or resin composition is to be impregnated, with a fluid of the substance, and a step (the second step) of releasing the resin or resin composition impregnated with the substance from the foregoing pressurized condition in a period of less than 10 seconds. (Hereinafter, it may sometimes be referred to as the process of the present invention.) (Crystalline Thermoplastic Resin or Resin Composition Containing, as an Elementary Ingredient, a Crystalline Thermoplastic Resin)
   (a) A polypropylene resin which is a crystalline thermoplastic resin
   (b) A resin composition comprising not less than 50% by weight of a polypropylene resin which is a crystalline thermoplastic resin, as an elementary ingredient
   (c) A resin composition comprising 60 to 90 parts by weight of a crystalline thermoplastic resin as an elementary ingredient and 10 to 40 parts by weight of a non-crystalline thermoplastic resin
   (d) A crystalline thermoplastic resin or a crystalline thermoplastic resin composition wherein an endothermic curve obtained by measurement at a rate of heating of 10° C./min using a differential scanning calorimeter (DSC) has at least one endothermic peak and wherein when taking the highest peak point among the at least one endothermic peak as A, taking the point appearing on the higher temperature side at which the minimum endothermic heat value is given as F, taking the point at which a straight line (a base line) which passes through the point F and is parallel to the temperature axis intersects a perpendicular dropped from the point A to the temperature axis as B, taking the point which internally divides the segment AB in the perpendicular into 9:1 as C, taking the point at which a straight line which passes through the point C and is parallel to the temperature axis intersects the endothermic curve at the lowest temperature as D, and taking the point at which the line CD intersects the endothermic curve at the highest temperature as E, a difference in temperature indicated by the length of the segment DE is 20° C. or more.

2. the process for producing a foamed resin article according to the above 1, wherein the release from the pressurized condition in the second step is conducted in a period of 3 seconds or shorter.

3. the process for producing a foamed resin article according to the above 1, wherein the second step is conducted at a lower temperature than a temperature at which the first step is conducted.

4. the process for producing a foamed resin article according to the above 1, wherein the release from the pressurized condition in the second step is conducted at a lower temperature than a melting point of the resin or resin composition used.

5. the process for producing a foamed resin article according to the above 1, wherein the impregnation in the first step is conducted under the pressurized conditions of at a temperature of 300° C. or lower, in a period of 5 hours or shorter and at a pressure of 10 MPa or higher.

6. the process for producing a foamed resin article according to the above 1, wherein the impregnation in the first step is conducted under the pressurized conditions of at a temperature in the range of 60 to 230° C., in a period of 3 hours or shorter and at a pressure in the range of 10 to 50 MPa.

7. the process for producing a foamed resin article according to the above 1, wherein the crystalline thermoplastic resin is a polypropylene resin, which is a crystalline thermoplastic resin. (Hereinafter, it may sometimes be referred to as the process A of the present invention.)

8. the process for producing a foamed resin article according to the above 1, wherein the resin composition is a resin composition comprising not less than 50% by weight of a polypropylene resin which is a crystalline thermoplastic resin, as an elementary ingredient. (Hereinafter, it may sometimes be referred to as the process A' of the present invention.)

9. the process for producing a foamed resin article according to the above 1, wherein the resin composition is a resin composition comprising 60 to 90 parts by weight of a crystalline thermoplastic resin as an elementary ingredient and 10 to 40 parts by weight of a non-crystalline thermoplastic resin. (Hereinafter, it may sometimes be referred to as the process B of the present invention.)

10. the process for producing a foamed resin article according to the above 9, wherein the resin composition comprises a crystal phase and a non-crystal phase and the size of the non-crystal phase is 10 to 200 nm.

11. the process for producing a foamed resin article according to the above 1, wherein the crystalline thermoplastic resin or the resin composition is a crystalline thermoplastic resin or a crystalline thermoplastic resin composition wherein an endothermic curve obtained by measurement at a rate of heating of 10° C./min using a differential scanning calorimeter (DSC) has at least one endothermic peak and wherein when taking the highest peak point among the at least one endothermic peak as A, taking the point appearing on the higher temperature side at which the minimum endothermic heat value is given as F, taking the point at which a straight line (a base line) which passes through the point F and is parallel to the temperature axis intersects a perpendicular dropped from the point A to the temperature axis as B, taking the point which internally divides the segment AB in the perpendicular into 9:1 as C, taking the point at which a straight line which passes through the point C and is parallel to the temperature axis intersects the endothermic curve at the lowest temperature as D, and taking the point at which the line CD intersects the endothermic curve at the highest temperature as E, a difference in temperature indicated by the length of the segment DE is 20° C. or more. (Hereinafter, it may sometimes be referred to as the process C of the present invention.)

12. A foamed resin article produced by the process of the above 1. (Hereinafter, it may sometimes be referred to as the foamed resin article of the present invention.)

13. A foamed resin article characterized by being formed of a polypropylene resin which is a crystalline thermoplastic resin, or a resin composition comprising not less than 50% by weight of a polypropylene resin which is a crystalline thermoplastic resin, and by having an average cell density of not less than $10^{11}$ cells per cubic centimeter ($cm^3$) of said resin or said resin composition. (Hereinafter, it may sometimes be referred to as the foamed resin article A of the present invention.)

14. The foamed resin article according to the above 13, wherein an average cell diameter is not greater than 2 $\mu$m.

15. A foamed resin article characterized by being formed of a resin composition comprising 60 to 90 parts by weight of a crystalline thermoplastic resin as an elementary ingredient and 10 to 40 parts by weight of a non-crystalline thermoplastic resin, and by having an average cell density of not less than $10^{11}$ cells per cubic centimeter ($cm^3$) of said resin or said resin composition. (Hereinafter, it may sometimes be referred to as the foamed resin article B of the present invention.)

16. The foamed resin article according to the above 15, wherein the non-crystalline thermoplastic resin is a polyolefin-based elastomer.

17. The foamed resin article according to the above 16, wherein the polyolefin-based elastomer is a hydrogenated styrene/butadiene copolymer or a propylene/butene copolymer.

18. A foamed resin article characterized by being formed of a crystalline thermoplastic resin or crystalline thermoplastic resin composition wherein an endothermic curve obtained by measurement at a rate of heating of 10° C./min using a differential scanning calorimeter (DSC) has at least one endothermic peak and wherein when taking the highest peak point among the at least one endothermic peak as A, taking the point appearing on the higher temperature side at which the minimum endothermic heat value is given as F, taking the point at which a straight line (a base line) which passes through the point F and is parallel to the temperature axis intersects a perpendicular dropped from the point A to the temperature axis as B, taking the point which internally divides the segment AB in the perpendicular into 9:1 as C, taking the point at which a straight line which passes through the point C and is parallel to the temperature axis intersects the endothermic curve at the lowest temperature as D, and taking the point at which the line CD intersects the endothermic curve at the highest temperature as E, a difference in temperature indicated by the length of the segment DE is 20° C. or more, and by having an average cell diameter of not greater than 10 $\mu$m and an expansion ratio of not less than twice and not more than 40 times. (Hereinafter, it may sometimes be referred to as the foamed resin article C of the present invention.)

According to the foregoing process, a foamed resin article having fine cells in a cell density higher than that achieved by foaming resin materials other than the above-mentioned crystalline thermoplastic resin or resin composition comprising, as an essential ingredient, a crystalline thermoplastic resin (henceforth, the both may be referred to as "the present resin material").

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE PREFERRED EMBODIMENTS

In the process of the present invention is first conducted a step (the first step) of impregnating the present resin material, under an elevated pressure which is not lower than the critical pressure of a substance with which the resin material is to be impregnated (henceforth, this substance may be referred to as an impregnating substance), with a fluid of the impregnating substance. Henceforth, this step is sometimes referred to as an impregnating step.

The following is an explanation for the cases where the present resin material is:
(a) a polypropylene resin which is a crystalline thermoplastic resin, or
(b) a resin composition comprising not less than 50% by weight of a polypropylene resin which is a crystalline thermoplastic resin, as an elementary ingredient.

The crystalline thermoplastic resin used here may be exemplified by propylene homopolymers or propylene copolymers containing not less than 50% by weight of propylene monomer units. Preferred propylene copolymers include binary or ternary copolymers of propylene and ethylene or an α-olefin other than propylene. The α-olefin may be exemplified by linear or branched α-olefins having not less than 4 carbon atoms such as 1-butene, 4-methylpentene-1, 1-octene and 1-hexene. Preferred are linear or branched α-olefins having not more than 10 carbon atoms in view of copolymerizability with propylene.

From the viewpoint of strength, propylene homopolymers are preferred. On the other hand, propylene copolymers are preferred from the viewpoints of flexibility, transparency and the like. In the case of using a copolymer, a content of monomers in the copolymer other than propylene is preferably not more than 10% by weight for ethylene, not more than 30% by weight for other α-olefins. Moreover, from the viewpoint that foamed resin articles having high strength and having fine cells can be obtained, mixtures of a propylene homopolymer and a copolymer of propylene and ethylene or copolymer of propylene and α-olefin other than propylene also are desirable. In the case of using such mixtures, a composition prepared by separately producing a propylene homopolymer and a copolymer of propylene and ethylene or a copolymer of propylene and α-olefin other than propylene in advance and then kneading them with a kneader or the like may be used and also a so-called block copolymer prepared by homopolymerizing propylene and subsequently copolymerizing propylene and ethylene or propylene and α-olefin other than propylene may be used. Of course, the block copolymer may be blended with the propylene homopolymer, the copolymer of propylene and ethylene, the copolymer of propylene and α-olefin other than propylene or the like. The foregoing polypropylene resins may by used singly or in combination of two or more of them.

Furthermore, the polypropylene resin may be a polypropylene resin having long chain branches introduced by low-level electron beam crosslinking, which is disclosed in Japanese Unexamined Patent Publication No. Sho 62-121704, or a polypropylene resin having super high molecular weight components introduced as mentioned later.

Such a polypropylene resin having super high molecular weight components introduce may be exemplified by super high molecular weight-containing polymers obtained by producing, in the first stage, a crystalline polypropylene polymer (I) having a limiting viscosity of 5 dl/g or more by polymerizing monomers mainly containing propylene and successively producing, in the second stage, a crystalline propylene polymer (II) having a limiting viscosity of less than 3 dl/g by polymerizing monomers mainly containing propylene. Among such super high molecular weight-containing polymers, preferred, from the viewpoint of a melt viscosity during foaming, are super high molecular weight-containing polymers wherein a content of the polymer (I) is not less than 0.05% by weight and less than 35% by weight of the super high molecular weight-containing polymer, a limiting viscosity of the super high molecular weight-containing polymer is lower than 3 dl/g, and Mw/Mn is less than 10% by weight.

Compositions composed of the aforementioned polypropylene resin and an olefin-based elastomer are desirable as the present resin material because in supercritical foaming as mentioned later using such compositions as the present resin material, foamed resin articles having fine cells in remarkably high cell densities can be obtained.

The foregoing olefin-based elastomers may be exemplified by ethylene/α-olefin copolymers, ethylene/propylene/diene copolymers, polybutadiene and hydrogenated products thereof, styrene/isoprene/styrene copolymers, styrene/ethylene/butadiene/styrene copolymers, styrene/butadiene copolymers, styrene/ethylene/propylene/styrene copolymers and styrene/butadiene/styrene copolymers. The α-olefin may be exemplified by the same species as previously mentioned.

In particular, foaming a resin material having a morphology formed therein wherein non-crystal phases are dispersed in a polypropylene resin can afford a foamed resin article having extremely fine cells in an extremely high cell density. Therefore an olefin-based elastomer-containing polypropylene obtained by blending a polypropylene resin with such an olefin-based elastomer that can be finely dispersed in the polypropylene resin is preferably employed. Specific examples of such useful olefin-based elastomers include styrene/butadiene copolymers and hydrogenated products thereof. In particular, hydrogenated styrene/butadiene copolymers containing 10% styrene monomer units are preferred in the viewpoint of the morphology mentioned above.

When the foamed resin article is formed of an olefin-based elastomer-containing polypropylene resin composition, an amount of the olefin-based elastomer to be incorporated to 100 parts by weight of the polypropylene resin preferably is not less than 0.01 parts by weight, and less than 100 parts by weight from the standpoints of heat resistance and oil resistance. Particularly preferred is 1 to 18 parts by weight.

A melt flow rate (MFR) of the resin material used here preferably is not lower than 0.1 from the viewpoints of processability, particularly extrusion processability. It also preferably is not higher than 50 from the viewpoints that a viscosity at which the resin material can stand a gas expansion pressure during foaming can be easily maintain, that cell breakage can be prevented to occur, and that supermicroporous foamed resin articles can be obtained.

The aforementioned resin materials may contain polyethylene resins, examples of which include low density polyethylenes, high density polyethylenes, and linear low density polyethylenes. In the case of incorporating such a polyethylene resin, an amount thereof preferably is not less than 0.01 parts by weight, particularly not less than 3 parts by weight per 100 parts by weight of the aforementioned resin material from the viewpoint of effects. On the other hand, an amount of the polyethylene resin preferably is not more than 30 pats by weight, particularly not more than 20 parts by weight, from the viewpoint of its compatibility with the polypropylene resin. In addition, an MFR of the polyethylene resin preferably is not lower than 0.1 from the viewpoint of its compatibility with the polypropylene resin, and not higher than 10 from the viewpoint that cell breakage can be prevented to occur and supermicroporous foamed resin articles can be obtained.

The resin material used here may be in the form of either powder or pellets, for its preparation may be applied heretofore known techniques. For example, a composition composed of a polypropylene, which is a crystalline thermoplastic resin, and an olefin-based elastomer may be prepared by heretofore known techniques. For example, a method in which the both materials are melt kneaded by using a single or twin screw extruder and extruded into pellets may be employed. A Banbury-type kneader may be used for kneading. Incorporation of the foregoing polyethylene resin may use the same technique as previously mentioned.

The following explanation is for the case where the present resin material is (c) the resin composition comprising 60 to 90 parts by weight of a crystalline thermoplastic resin as an elementary ingredient and 10 to 40 parts by weight of a non-crystalline thermoplastic resin.

The crystalline thermoplastic resin used here may be exemplified by polyolefin resins (e.g., polyethylene resins and polypropylene resins), polyamide resins, polyethylene terephthalate resins, syndiotactic polystyrene resin and polyvinyl alcohol resins. Although such crystalline thermoplastic resins may be either resins composed only of a crystal phase or resins composed of a crystal phase and a non-crystal phase, the latter are preferable. One species of the crystalline thermoplastic resins may be used or two or more species of them may be used in combination.

Examples of polypropylene resins used here include propylene homopolymers and propylene copolymers containing not less than 50 mole % of propylene monomer units. Preferred propylene copolymers are binary or ternary copolymers of propylene and a copolymerizable monomer such as ethylene and/or α-olefin except propylene. The α-olefin may be exemplified by α-olefins having 4 to 10 carbon atoms such as 1-butene, 4-methylpentene-1, 1-hexene, 1-octene and 1-decene. A content of the repeating units derived from polymerizable monomers in the foregoing copolymers is not more than 10% by weight for the cases where the polymerizable monomer is ethylene and not more than 30% by weight for the cases of polymerizable monomers other than ethylene.

Moreover, the polypropylene resin may also be either a polypropylene resin having long chain branches introduced by low-level electron beam crosslinking, which is disclosed in Japanese Unexamined Patent Publication No. Sho 62-121704, or a polypropylene resin having super high molecular weight components introduced. A preferred example of the polypropylene having super high molecular weight components introduced is one obtained by producing, in the first stage, a crystalline polypropylene polymer (I) having a limiting viscosity of 5 dl/g or more by polymerizing monomers mainly containing propylene and successively producing, in the second stage, a crystalline propylene polymer (II) having a limiting viscosity of less than 3 dl/g by polymerizing monomers mainly containing propylene. Among such super high molecular weight-containing polymers, preferred, from the viewpoint of a melt viscosity during foaming, are ones (super high molecular weight-containing polymers) wherein a content of the aforementioned (I) is not less than 0.05% by weight and less than 35% by weight of the super high molecular weight-containing polymer, a limiting viscosity of the super high molecular weight-containing polymer is lower than 3 dl/g, and Mw/Mn is less than 10.

The non-crystalline thermoplastic resin used here may be, but is not limited to, thermoplastic elastomers such as polyester elastomers, polyamide elastomers and polyolefin elastomers. Among the non-crystalline thermoplastic resin mentioned above, the polyester elastomers are preferably used in combination with crystalline polyester resins, the polyamide elastomers are preferably used in combination with crystalline polyamide resins and the polyolefin elastomers are preferably used in combination with crystalline polyolefin resins. When the aforementioned crystalline thermoplastic resin is composed of a crystal phase and a non-crystal phase, a part of or the whole of the foregoing non-crystalline thermoplastic resin may be dissolved in the non-crystal of the crystalline thermoplastic resin to expand it. Use of the crystalline thermoplastic resin composed of a crystal phase and a non-crystal phase and the non-crystalline thermoplastic resin in combination may adequately adjust the size of the non-crystal phase of the crystalline thermoplastic resin.

In particular, when a crystalline polypropylene resin and a polyolefin elastomer are used in combination, examples of preferable polyolefin elastomers include ethylene/α-olefin copolymers, propylene/α-olefin copolymers, ethylene/propylene/diene/methylene copolymers (EPDMR), polybutadienes and their hydrogenated products, styrene/isoprene/styrene copolymers, styrene/ethylene/butadiene/styrene copolymers, styrene/butadiene copolymers, styrene/ethylene/propylene/styrene copolymers, and styrene/butadiene/styrene copolymer and their hydrogenated products. The styrene/butadiene copolymers and propylene/butene copolymers are more preferable. Hydrogenated styrene/butadiene copolymers containing about 10% by weight repeating units derived from styrene are especially preferably used.

An amount of the non-crystalline thermoplastic resin in the resin composition used here is 10 to 40 parts by weight, preferably 10 to 30 parts by weight per 100 parts by weight of the sum of the non-crystalline thermoplastic resin and the aforementioned crystalline thermoplastic resin. When the amount of the non-crystalline thermoplastic resin is less than 10 parts by weight, a satisfactory effect on a cell density improvement can not be enjoyed. When it exceeds 40 parts by weight, characteristics of the crystalline thermoplastic resin used together tend to deteriorate. For example, in the case of a resin composition composed of a polypropylene resin and a non-crystalline thermoplastic resin, heat resistance and oil resistance of the polypropylene resin deteriorates when a content of the non-crystalline thermoplastic resin exceeds 40 parts by weight.

When the aforementioned resin composition contains a polypropylene resin, a polyethylene resin and a polyolefin-based thermoplastic elastomer, a content of the polyethylene resin is preferably 0.01 to 30% by weight, more preferably 3 to 20% by weight of the total resin composition. Incorporation of such an amount of the polyethylene resin may provide a good effect on cell density improvement. A low density polyethylene (LDPE), a high density polyethylene (HDPE) and a linear low density polyethylene (LLDPE) are preferably used as the polyethylene resin. A melt flow rate (MFR) of the polyethylene resin is preferably not lower than 1 g/10 minutes and not higher than 10 g/10 minutes.

An MFR of the total of the aforementioned resin composition is preferably in the range of not lower than 0.1 g/10 minutes and not higher than 50 g/10 minutes. When the MFR is lower than 0.1 g/10 minutes, deterioration in extrusion processability becomes pronounced. When the MFR exceeds 50 g/10 minutes, the resin composition can not stand an expansion gas pressure during foaming and causes cell breakage, and there is a tendency of increasing difficulty of obtaining foamed resin articles having uniform fine cells.

The aforementioned resin composition made of the crystalline thermoplastic resin and the non-crystalline thermoplastic resin is composed of a crystal phase and a non-crystal phase. When a size of the non-crystal phase is 10 to 200 nm, a satisfactory effect on cell density improvement can be obtained and the size of the non-crystal phase is preferably 15 to 100 nm. The size of the non-crystal phase used herein means an average determined by the following method. A resin composition which has been cooled and solidified is cut first and a cut section is stained with a coloring matter (for example, $RuO_4$). The colored part is sliced into a thickness of not greater than 1000 Å with a microtome while being cooled. The resulting slice is taken its photograph with a transmission microscope (in general, a magnification is approximately ×50,000 to ×60,000). In a square viewing field containing about 50 non-crystal phase sections found in the resulting photograph, a diameter of the largest circle contained in each non-crystal phase section is measured and the average of the measurements is calculated. This average is defined as the size of the non-crystal phase of the resin composition.

A preparation method of the aforementioned resin composition is not particularly limited. For example, the resin composition may be prepared by melt kneading the crystalline thermoplastic resin and the non-crystalline thermoplastic resin by using a single or twin screw extruder, which is generally used for kneading a resin material. The resulting resin composition may be formed into pellets, a sheet or the like. The melt kneading may be conducted by using a kneading machine such as a Banbury-type mixer.

The following is an explanation for the case where the present resin material is (d) a crystalline thermoplastic resin or a crystalline thermoplastic resin composition wherein an endothermic curve obtained by measurement at a rate of heating of 10° C./min using a differential scanning calorimeter (DSC) has at least one endothermic peak and wherein when taking the highest peak point among the at least one endothermic peak as A, taking the point appearing on the higher temperature side at which the minimum endothermic heat value is given as F, taking the point at which a straight line (a base line) which passes through the point F and is parallel to the temperature axis intersects a perpendicular dropped from the point A to the temperature axis as B, taking the point which internally divides the segment AB in the perpendicular into 9:1 as C, taking the point at which a straight line which passes through the point C and is parallel to the temperature axis intersects the endothermic curve at the lowest temperature as D, and taking the point at which the line CD intersects the endothermic curve at the highest temperature as E, a difference in temperature indicated by the length of the segment DE is 20° C. or more.

Figure 1:
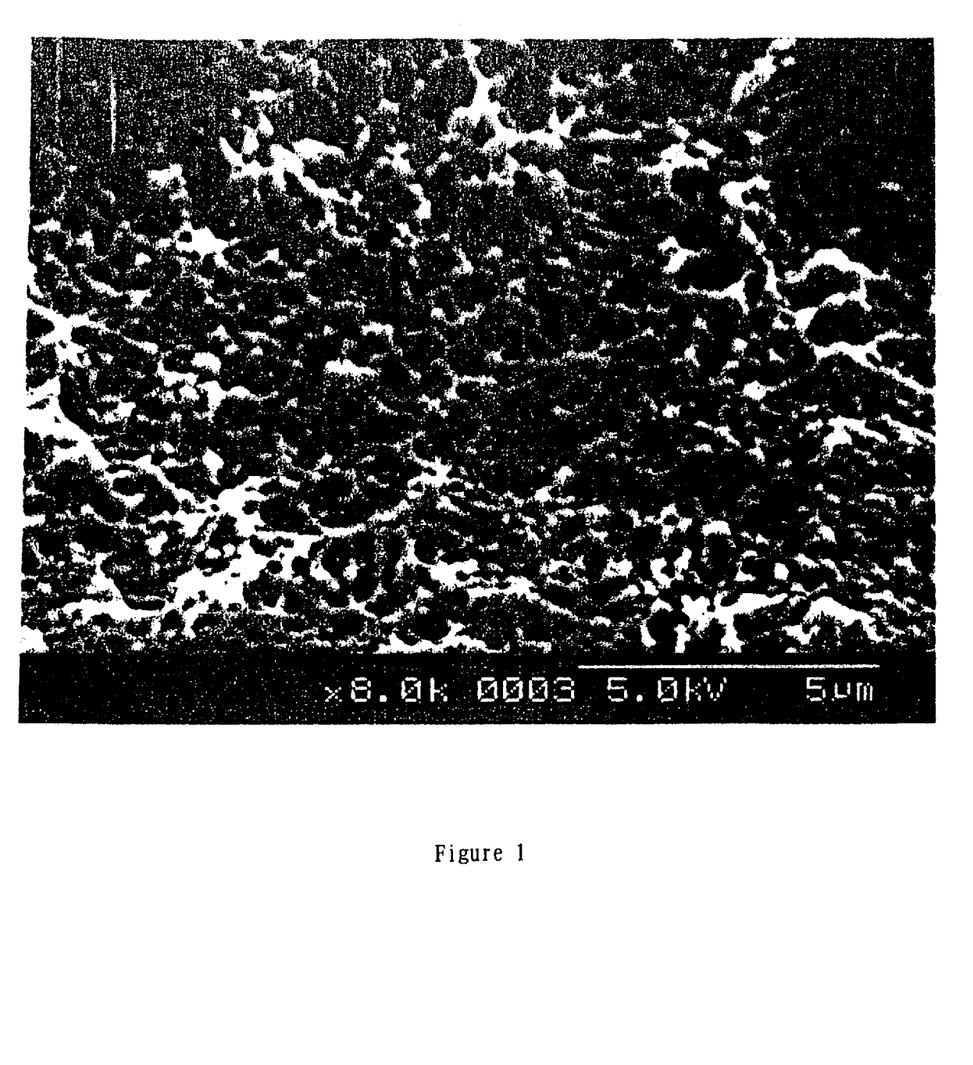
FIG. 1 is an electron microscope photograph of a cross section of the foamed resin article obtained in Example 1.
Figure 2:
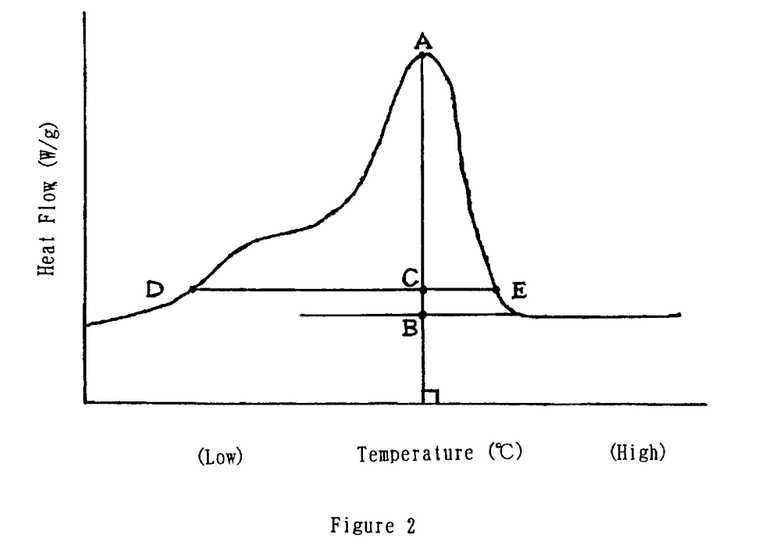
FIG. 2 is an exemplary endothermic curve by DSC (a schematic drawing) of a crystalline thermoplastic resin.

As for the crystalline thermoplastic resin or the crystalline thermoplastic resin composition used here, the difference in temperature corresponding to the segment DE is preferably not less than 25° C. and not more than 100° C., more preferably not less than 30° C. and not more than 100° C. FIG. 1 shows an exemplary endothermic curve (a schematic drawing) of a crystalline thermoplastic resin obtained by DSC. The crystalline thermoplastic resin used here is not particularly limited in kind as long as its endothermic curve determined by a differential scanning calorimeter (DSC) meets the aforementioned conditions. For example, polyolefin resins (e.g., polyethylene resins and polypropylene resin), polyamide resins, polyethylene terephthalate resins, syndiotactic polystyrene resins and polyvinyl alcohol resins are mentioned. Among these, the polyolefin resins are preferably used. One species of the crystalline thermoplastic resins may be used and also two or more species of them may be used in combination.

The polyethylene resins used here include low density polyethylenes (LDPE), high density polyethylenes (HDPE), linear low density polyethylenes (LLDPE) and ethylene/α-olefin copolymers.

The polypropylene resins used here include propylene homopolymers and propylene copolymers containing not less than 50 mole % of propylene monomer units. Preferable propylene copolymers are binary or ternary copolymers of propylene and a copolymerizable monomer such as ethylene and/or α-olefin except propylene. The α-olefin may be exemplified by include linear or branched α-olefins having not less than 4 carbon atoms such as 1-butene, 4-methylpentene-1, 1-octene and 1-hexene. From the viewpoint of polymerizability with propylene, linear or branched α-olefins having not more than 10 carbon atoms.

From strength of foamed resin articles, propylene homopolymers are preferred. From flexibility or transparency of foamed resin articles, propylene copolymers are preferred. When a propylene copolymer is used, a content of monomer units other than propylene in the copolymer is not more than 10% by weight for ethylene and not more than 30% by weight for α-olefins. From the viewpoint that foamed resin articles having fine cells and good in mechanical strength may be obtained, mixtures of propylene homopolymers and propylene/ethylene copolymers or propylene/α-olefin copolymers are also preferred. In the case of using such a mixture, use of a resin composition prepared by kneading a polypropylene homopolymer and a polypropylene copolymer, which have been prepared separately, with a kneading machine or the like is permitted and also use of a resin composition prepared by homopolymerizing propylene and subsequently copolymerizing propylene and a copolymerizable monomer (ethylene or an α-olefin other than propylene) is permitted. Of course, the latter resin composition may be used by being mixed with a propylene homopolymer, a propylene/ethylene copolymer, a propylene/α-olefin copolymer or the like.

Moreover, the polypropylene resin may also be either a polypropylene resin having long chain branches introduced by low-level electron beam crosslinking, which is disclosed in Japanese Unexamined Patent Publication No. Sho 62-121704, or a polypropylene resin having super high molecular weight components introduced. A preferred example of the polypropylene having super high molecular weight components introduced is one obtained by producing, in the first stage, a crystalline polypropylene polymer (I) having a limiting viscosity of 5 dl/g or more by polymerizing monomers mainly containing propylene and successively producing, in the second stage, a crystalline propylene polymer (II) having a limiting viscosity of less than 3 dl/g by polymerizing monomers mainly containing propylene. Among such super high molecular weight-containing polymers, preferred, from the viewpoint of a melt viscosity during foaming, are ones super high molecular weight-containing polymers wherein a content of the aforementioned (I) is not less than 0.05% by weight and less than 35% by weight of the super high molecular weight-containing polymer, a limiting viscosity of the super high molecular weight-containing polymer is lower than 3 dl/g, and Mw/Mn is less than 10.

The aforementioned crystalline thermoplastic resin or thermoplastic resin composition preferably has an MFR falling in the range of not lower than 0.1 g/10 minutes and not higher than 50 g/10 minutes. When the MFR is lower than 0.1 g/10 minutes, deterioration in extrusion processability becomes pronounced. When the MFR exceeds 50 g/10 minutes, the resin composition can not stand an expansion gas pressure during foaming and causes cell breakage, and there is a tendency of increasing difficulty of obtaining foamed resin articles having uniform fine cells.

A preparation method of the aforementioned crystalline thermoplastic resin or thermoplastic resin composition is not particularly limited. For example, the resin composition may be prepared by melt kneading the present resin material by using a single or twin screw extruder, which is ordinarily used for kneading a resin material. The present resin composition obtained may be formed into pellets, a sheet or the like. The melt kneading may be conducted by using a kneading machine such as a Banbury type mixer.

In the impregnating step in the process of the present invention, the present resin material is impregnated, under an elevated pressure which is not lower than the critical pressure of a substance (impregnating substance) with which the present resin material is to be impregnated, with a fluid (that is, a liquid or critical fluid) of the substance. The impregnating substance preferably used may be substances which are in a gas state at ordinary pressure and ordinary temperature, for example, organic compounds such as butane and pentane or inorganic compounds such as carbon dioxide, air, hydrogen, nitrogen, neon and argon. The foregoing impregnating substance may be mixtures of two or more species. From the viewpoint of ease to handle, inert substances such as carbon dioxide, air, nitrogen, neon and argon are preferred. In particular, carbon dioxide or mixtures of carbon dioxide and other substance(s) are preferably used from the viewpoints of cost efficiency and safety.

An amount of the aforementioned impregnating substance with which the present resin material is impregnated is adequately set in accordance with kind of the impregnating substance, an expansion ratio and a cell density of the desired foamed resin article and the like. The lower limit thereof is generally an amount sufficient to form fine cells at a sufficient expansion ratio. There is no particular upper limit of an impregnating amount, but in general, it is exactly or approximately a saturated solubility of the impregnating substance to the present resin material. The impregnating amount need not achieve the saturated solubility. For example, a preferred amount of carbon dioxide with which a resin composition mainly containing a polyolefin resin is impregnated falls preferably in the range of not less than 0.1 part by weight and not more than 20 parts by weight, more preferably in the range of 0.1 to 15 parts by weight, relative to 100 parts by weight of the resin composition.

A pressure (henceforth, referred to as an impregnation pressure) and temperature at which the present resin material is impregnated with an impregnating substance, a time required for impregnation and the like vary depending upon a desired impregnating amount. For example, in the case where a resin composition is impregnated with carbon dioxide, whose critical pressure is about 7.5 MPa, although an impregnation pressure is required only to be at least this critical temperature, it preferably is not lower than 10 MPa. Moreover, although an upper limit of the impregnation pressure varies depending upon the ability of equipment and the like, it generally is about 50 MPa.

A temperature at which the present resin material is impregnated with the impregnating substance (henceforth, referred to as an impregnation temperature) is a temperature at which the impregnating substance can become a liquid or a critical fluid, and preferably is a temperature not lower than the critical temperature of the impregnating substance. An upper limit of the impregnation temperature is required only to be a temperature at which the present resin material used does not decompose, and generally is not higher than 300° C. In the case of using carbon dioxide, whose critical temperature is about 31° C., the impregnation temperature preferably is at least this critical temperature, and in particular, it preferably is not lower than 60° C. from the viewpoints of an infiltrating speed of carbon dioxide to the present resin material and productivity, and not higher than 230° C. from the viewpoint of a solubility of carbon dioxide to the present resin material.

A time which is spent for impregnating the present resin material with the impregnating substance (henceforth, referred to as an impregnation time) varies in accordance with an infiltrating speed of the impregnating substance to the present resin material and depends upon the aforementioned impregnation pressure and impregnation temperature. Although continuing the impregnating operation can increase the impregnating amount up to the saturated solubility, the impregnation time is generally set to at most a time sufficient for the impregnating amount of the impregnating substance to achieve the saturated solubility, and is generally up to several hours. From the viewpoint of productivity, a shorter impregnation time is preferred and there is no necessity of impregnating the present resin material with the impregnating substance until its amount achieves its saturated solubility. For example, in the case of carbon dioxide in the supercritical state, an impregnation time is generally from several minutes to about 5 hours. Preferred is from several minutes to about 3 hours from the viewpoint of a balance between productivity and an impregnating amount.

In the process of the present invention, subsequent to the aforementioned impregnation step is carried out a step (the second step) of releasing the present resin material impregnated with the impregnating substance from the pressurized condition in the aforementioned impregnation step in a period of less than 10 seconds. This step is sometimes referred to as a pressure releasing step in the following explanation.

In the process of the present invention, subsequent to the aforementioned impregnation step is carried out a step (the second step) of releasing the present resin material impregnated with the impregnating substance from the foregoing pressurized condition in the aforementioned impregnation step in a period of less than 10 seconds (this step is sometimes referred to as a pressure releasing step in the following explanation). The present resin material may further be heated after the pressure releasing step. In the pressure releasing step, the releasing from the pressurized condition is preferably completed in a period of less than 10 seconds, more preferably in a period of time as short as possible. If this operation is conducted slowly, foamed resin articles having desired cell densities sometimes are not obtained. In general, the pressure is released from the impregnation pressure to about ordinary pressure instantaneously. The phrase "to release a pressure instantaneously" used herein means to lower a pressure from the impregnation pressure to about ordinary pressure in a period of time as short as possible. Depending on a capacity of a container used for impregnation of the impregnating substance, the thickness of an exhaust pipe and the like, a more preferable period of time for lowering a pressure from the impregnation pressure to ordinary pressure may be about 3 seconds or less.

A sudden release of pressure in the aforementioned pressure releasing step may be conducted either at a temperature higher than that of the impregnation step, at a temperature lower than that of the impregnation step or at the same temperature as that of the impregnation step. In order to achieve a finer cell size an a higher cell density, the release of pressure is preferably conducted at a lower temperature than that at which the impregnation step was conducted. For example, a foamed resin article may be obtained by conducting the impregnation step at a temperature not lower than the critical temperature and not higher than the melting point of the present resin material; in the pressure releasing step, suddenly releasing pressure at a temperature higher than the temperature of the impregnation temperature, for example a temperature not lower than the melting point of the present resin material to form and grow cell nucleuses; and adequately controlling the growth of the cell nucleuses by taking advantage of the drop in temperature caused by the sudden release of pressure. Moreover, a foamed resin article may also be obtained by setting the present resin material to a temperature not lower than the melting point of the present resin material; in the pressure releasing step, once cooling the present resin material down to a temperature not higher than said melting point; subsequent to this, suddenly releasing pressure to form cell nucleuses; and further growing the cell nucleuses adequately. Furthermore, it is also permitted to set the temperature at the impregnation step not higher than the melting temperature of the present resin material and conducting the pressure releasing step at that temperature. In order to achieve a finer cell size and a higher cell density, it is preferable to carry out the release of pressure at a temperature lower than that of the impregnation step.

In order to control cell breakage as much as possible, a temperature of the present resin material at the time of pressure releasing is preferably not higher than the melting point of the present resin material. In order to achieve a finer cell size and a higher cell density, it preferably is in the range of not lower than (the melting point of the present resin material—100° C.) and not higher than the melting point of the present resin material, more preferably is in the range of not lower than (the melting point of the present resin material—50° C.) and not higher than the melting point of the present resin material. A temperature at which pressure is released is not required to be constant. In general, the temperature drops with the pressure releasing. Although there is no necessity of controlling such drop in temperature, it is preferable to control the drop in temperature from the viewpoint of controlling a cell density.

Furthermore, in order to control the cell density more adequately, it is preferable that, in the pressure releasing step, temperatures and times of both a process of growing cell nucleuses conducted subsequent to a process of forming cell nucleuses and a process of stopping the growth of cells are further controlled.

In the aforementioned process of growing cell nucleuses, a temperature at which the cell nucleuses are grown is preferably controlled to fall within the range of not lower than the crystallizing temperature of the present resin material and not higher than the melting point of this material in order to control the cell breakage as much as possible. A period of time for growing cell nucleuses is generally 20 seconds to 30 seconds though it may be set adequately in accordance with the desired cell density.

For the purpose of controlling the cell breakage caused by excessive growth of cells, it is preferable to control the temperature during the process of stopping the growth of cells as well as that during the process of growing cell nucleuses. The temperature at which the growth of cells is stopped is preferably not higher than the crystallizing temperature of the present resin material and it is also preferable that the whole foamed resin article is fully cooled until it reaches a temperature not higher than its crystallizing temperature.

Although the above explanation mainly describes embodiments in which the process of the present invention is conducted in a batch system, a continuous system in which the impregnation step and the pressure releasing step are carried out continuously, for example, by using a single or multiple screw extruder may be applied for the process of the present invention.

Examples of the foamed resin articles of the present invention include:

the foamed resin article A of the present invention which may be produced by the process A or A' of the present invention;

the foamed resin article B of the present invention which may be produced by the process B of the present invention; and the foamed resin article C of the present invention which may be produced by the process C of the present invention.

In the case of the foamed resin article A or B, the foamed resin article has an average cell density of not less than $10^{11}$ cells per cubic centimeter (cm³). From the viewpoint of a balance among strength, heat resistance and light weight, it preferably has an average cell density of not less than $10^{12}$ cells/cm³ and an average cell diameter of not greater than 2 μm.

Moreover, although the foamed resin article comprises not less than 50% by weight of a propylene resin which is a crystalline thermoplastic resin, as an elementary ingredient, whose content is preferably at least 70% by weight, more preferably 85% by weight, from the viewpoints of strength, heat resistance and the like of a foamed resin article.

In the case of the foamed resin article C, the foamed resin article has an average cell diameter of not greater 10 μm and an expansion ratio of not less than twice and not more than 40 times, but it preferably has an average cell diameter ranging 0.01 to 1 μm and an expansion ratio of not less than 10 times and not more than 30 times.

According to the present invention, a foamed resin article having fine cells in a higher cell density, which has a high expansion ratio, and which is excellent in both light weight property and secondary workability. Such a foamed resin article is also excellent in mechanical strength, and therefore can be suitably employed, for example, for automobile parts, trays of containers for food items, building materials, cushion materials, heat insulating materials and the like.

EXAMPLES

The following examples further explain the present invention, but the invention is not limited to these examples.

Size of Non-Crystal Phase

The present resin material which had been cooled and solidified was cut with a microtome and a cut section was stained with $RuO_4$. The stained part was sliced into a thickness of not greater than 1000 Å with a microtome while being cooled. The resulting slice was taken its photograph by a transmission electron microscope with a magnification of ×60,000. The size of non-crystal phases (an average value) was determined from the resulting photograph.

Average Cell Diameter

A foamed resin article was cooled with liquid nitrogen and thereafter cut with a razor. A section was taken its photograph using a scanning electron microscope. A magnification of the microscope was adjusted so that about 50 cells could be seen in a viewing field of the electron microscope. From the resulting photograph of the section of the foamed resin article was measured the longest length of each cell in the viewing field, whose average was then calculated. The average of the resulting longest lengths was taken as the average cell diameter (2r).

Average Cell Density

The number (n) of cells per square centimeter (cm²) of the cross section of the foamed resin article was calculated from the photograph by an electron microscope used in the measurement of the average cell diameter. The number of cells (N) per unit volume was calculated by raising the resulting n to the three seconds power. From this number of cells (N) and the average cell diameter (2r) obtained above was calculated the number of cells per real unit volume of the present resin article constituting the foamed resin article, that is, the average cell density (unit: cells/cm³ material).

The detail is described below.

The term "the average cell density" has a concept which means the number of cells present in a portion of a foamed resin article formed of a unit volume (1 cm³) of a plastic material and is expressed by using the unit, cells/cm³.

An arbitrary section of a foamed resin article is first observed by an SEM (a scanning electron microscope), and from the number of cells observed in the viewing field is calculated the number of cells per unit section (1 cm$^2$), n (cells). The magnification of the SEM is only required to be a magnification at which cells can be observed clearly, and preferably is a magnification such that approximately 20 to 50 cells can be seen in a viewing field in general, and generally is from several hundreds times to about 10,000 times. The above-obtained n to the power of three seconds corresponds to the number of cells present per unit volume (1 cm$^3$) of the foamed resin article, N (cells).

On the other hand, for each cell observed in the SEM viewing field used in the aforementioned measurement of the number of cells, the longest length is measured and the average thereof, 2r (cm), is calculated, which is defined as the average cell diameter of cells in the foamed resin article. Under the assumption that all of the cells present in the foamed resin are spheres of radius r (cm), the total volume $V_1$ (cm$^3$) of the cells present in a unit volume (1 cm$^3$) of the foamed resin article is calculated in accordance with the following formula:

$$V1=(4\pi r^3/3)\times N$$

The volume V (cm$^3$) of the plastic material occupying the unit volume of the foamed resin article is given by the following formula:

$$V=1-V_1$$

Accordingly, the average cell density (cells/cm$^3$) used in the present invention is defined by the following formula:

$$\text{Average cell density}=1/\{1/N-4\pi r^3/3\}$$

Differential Scanning Calorimetry (DSC)

Using the model DSC-7 manufactured by Perkin-Elmer Ltd., an endothermic curve was recorded by heating about 10 mg of a sample at a rate of heating of 10° C./min from 30° C. to 200° C., maintaining it at this temperature for 1 minute, thereafter cooling the sample at a rate of 10° C./min down to 30° C. to solidify it, maintaining it at this temperature for 1 minute, and then heating it at a rate of 10° C./min again.

Secondary Workability

A foamed resin sheet 1.5 mm in thickness was vacuum formed into a container 15 cm in diameter and 5 cm in height. The appearance of the resulting formed article was evaluated. A ratio of the area where defects such as depressions, uneven thickness and the like to the total surface area was determined. The higher the volume of this ratio the poorer the secondary workability. The lower the value the better the secondary workability.

EXAMPLES 1 to 6

Used as a raw resin (a resin material) was an olefin-based elastomer-containing polypropylene resin composition prepared by melt blending, using a laboplast mill, 90% by weight of polypropylene (polypropylene manufactured by Sumitomo Chemical Co., Ltd., Noblene W101; MFR=8 to 10; propylene homopolymer) and 10% by weight of a hydrogenated styrene/butadiene copolymer rubber (SBR) (1320P manufactured by Japan Synthetic Rubber Co., Ltd.; styrene monomer unit content=10%; MFR=3.5). The raw resin was press molded into six sheets (thickness=1.5 mm; length=4 cm; width=2 cm) (press conditions: preheating at 230° C. for 3 minutes, pressing for 1 minute, and cooling for 5 minutes with a pressing plate kept at 30° C.). For every sheet, one sheet was placed in an autoclave which was equipped with a pressure gauge and an exhaust valve and whose temperature had been elevated to a predetermined temperature, and the autoclave was then covered with a lid. Carbon dioxide was thereafter pressed into the autoclave with pump and was forced to be in a supercritical state. The sheet was impregnated with the carbon dioxide at an impregnation pressure, at an impregnation temperature, for an impregnation time given in Table 1. The moment the pressure gauge reached the predetermined pressure was taken as the beginning of impregnation. The impregnation operation was continued while the impregnation pressure was kept. After the predetermined impregnation time had passed, the carbon dioxide was spewed from the autoclave through the exhaust valve to quickly release a pressure inside the autoclave from the impregnation pressure to ordinary pressure (about 0.1 MPa) (a releasing time=2 to 3 seconds).

After the pressure inside the autoclave had become ordinary pressure, the resulting foamed resin article was taken out and its average cell diameter and average cell density were determined. The results are shown in Table 1.

TABLE 1

| Example | Impregnation pressure[1) (MPa) | Impregnation temperature (° C.) | Impregnation time (h) | Average cell diameter ($\mu$m) | Average cell density (cells/cm$^3$) |
|---|---|---|---|---|---|
| 1 | 20 | 135 | 2 | 0.25 | $10^{13}$ |
| 2 | 20 | 145 | 2 | 0.5 | $10^{12}$ |
| 3 | 20 | 150 | 2 | 0.75 | $7 \times 10^{11}$ |
| 4 | 26 | 155 | 1 | 2.5 | $2 \times 10^{11}$ |
| 5 | 40 | 80 | 1 | 3 | $1.1 \times 10^{11}$ |
| 6 | 40 | 145 | 2 | 0.25 | $2.2 \times 10^{13}$ |

[1)]Gauge pressure

EXAMPLES 7 to 12

90 Parts by weight of polypropylene (Sumitomo Noblene W101 manufactured by Sumitomo Chemical Co., Ltd.; MFR=8 to 10 g/10 minutes) and 10 parts by weight of a hydrogenated styrene/butadiene copolymer (1320P manufactured by JSR Corp.; styrene content=10%; MFR=3.5 g/10 minutes) were melt blended by a twin screw extruder and extruded into a sheet (thickness=1.5 mm; length=4 cm; width=2 cm; size of non-crystal phases=15 nm). This sheet was placed in an autoclave, into which was then introduced supercritical carbon dioxide, so that the foregoing sheet was impregnated with the carbon dioxide. The pressure, temperature and time spent at the impregnation are given in Table 2. After the predetermined time had passed, the pressure inside the autoclave was released and the resulting foamed resin article was taken out.

TABLE 2

|  | Impregnation pressure (MPa) | Impregnation temperature (° C.) | Impregnation time (h) | Average cell diameter ($\mu$m) | Average cell density (cells/cm$^3$ material) |
|---|---|---|---|---|---|
| Example 1 | 20 | 135 | 2 | 0.25 | $10^{13}$ |
| Example 2 | 20 | 145 | 2 | 0.5 | $10^{12}$ |
| Example 3 | 20 | 150 | 2 | 0.75 | $7 \times 10^{11}$ |
| Example 4 | 26 | 155 | 1 | 2.5 | $2 \times 10^{11}$ |
| Example 5 | 40 | 80 | 1 | 3 | $1.1 \times 10^{11}$ |
| Example 6 | 40 | 145 | 2 | 0.25 | $2.2 \times 10^{13}$ |

COMPARATIVE EXAMPLES 1 to 5

A sheet (thickness=1.5 mm; length=4 cm; width=2 cm; size of non-crystal phases=9 nm) composed only of polypropylene (Sumitomo Noblene W101 manufactured by Sumitomo Chemical Co., Ltd.; MFR=8 to 10 g/10 minutes) was placed in an autoclave, into which was then introduced supercritical carbon dioxide, so that the foregoing sheet was impregnated with the carbon dioxide. The pressure, temperature and time spent at the impregnation are given in Table 3. After the predetermined time had passed, the pressure inside the autoclave was released. In Comparative Example 5, the sheet was immersed in a 170° C. oil bath for 30 seconds to be foamed after the pressure releasing.

COMPARATIVE EXAMPLES 6, 7

A sheet (thickness=1.5 mm; length=4 cm; width=2 cm; size of non-crystal phases=1000 nm) composed of 90 parts by weight of polypropylene (Sumitomo Noblene W101 manufactured by Sumitomo Chemical Co., Ltd.; MFR=8 to 10 g/10 minutes) and 10 parts by weight of polystyrene (GPPS) was placed in an autoclave, into which was then introduced supercritical carbon dioxide, so that the foregoing sheet was impregnated with the carbon dioxide. The pressure, temperature and time spent at the impregnation are given in Table 4. After the predetermined time had passed, the pressure inside the autoclave was released. After the pressure releasing, the resulting sheet was immersed in a 170° C. oil bath for 30 minutes.

TABLE 3

|  | Impregnation pressure (MPa) | Impregnation temperature (° C.) | Impregnation time (h) | Average cell diameter ($\mu$m) | Average cell density (cells/cm$^3$ material) |
|---|---|---|---|---|---|
| Comparative Example 1 | 20 | 135 | 2 | — | — |
| Comparative Example 2 | 20 | 165 | 2 | 250 | $1.2 \times 10^6$ |
| Comparative Example 3 | 20 | 155 | 2 | 50 | $2.2 \times 10^7$ |
| Comparative Example 4 | 26 | 155 | 1 | 100 | $1 \times 10^6$ |
| Comparative Example 5 | 40 | 80 | 1 | 15 to 20 | $10^8$ |

"—" means that no foam was formed.

TABLE 4

|  | Impregnation pressure (MPa) | Impregnation temperature (° C.) | Impregnation time (h) | Average cell diameter ($\mu$m) | Average cell density (cells/cm$^3$ material) |
| --- | --- | --- | --- | --- | --- |
| Comparative Example 6 | 40 | 40 | 2 | 10 to 15 | $10^7$ |
| Comparative Example 7 | 40 | 60 | 2 | 10 to 15 | $10^8$ |

EXAMPLE 13

Figure 3:
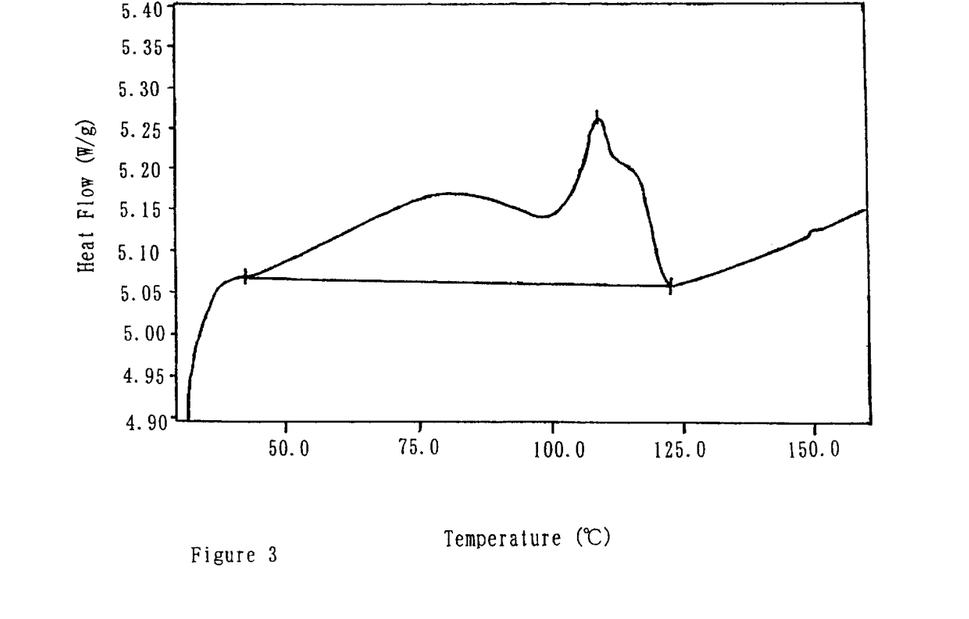
FIG. 3 is an endothermic curve by DSC of the linear low density polyethylene used in Example 13.
Figure 4:
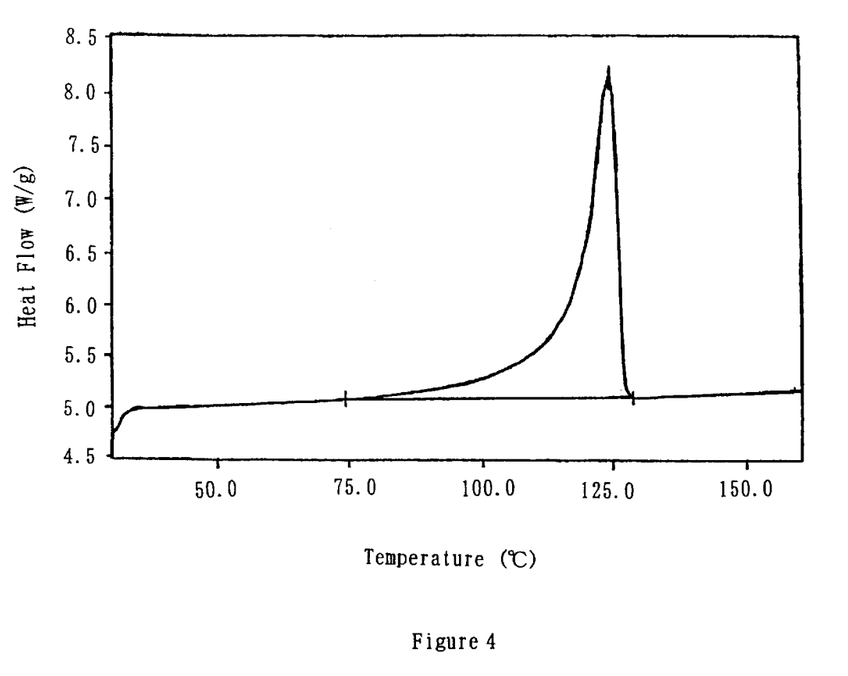
FIG. 4 is an endothermic curve by DSC of the linear low density polyethylene used in Comparative Example 8.

A sheet (thickness=1.5 mm; length=20 cm; width=20 cm) was prepared by preheating linear polyethylene (VL200 manufactured by Sumitomo Chemical Co., Ltd.; MFR=2 g/10 minutes; melting point=109° C.) at 160° C. for 3 minutes, thereafter pressing it for 1 minute, and then cooling it for 5 minutes with a pressing plate kept at 30° C. The endothermic curve by DSC of the polyethylene used is shown in FIG. 3.

Subsequently, the sheet was placed in an autoclave which was equipped with a pressure gauge and an exhaust valve and whose temperature had been elevated to a predetermined temperature, and the autoclave was then covered with a lid. Carbon dioxide was thereafter pressed into the autoclave and was forced to be in a supercritical state. The sheet was impregnated with the carbon dioxide at an impregnation pressure of 20 MPa, at an impregnation temperature of 90° C., for an impregnation time of 2 hours. The moment the pressure gauge reached the predetermined pressure was taken as the beginning of impregnation. The impregnation operation was continued while the impregnation pressure was kept. After the predetermined impregnation time had passed, the carbon dioxide was spewed from the autoclave through the exhaust valve to quickly release a pressure inside the autoclave until it became ordinary pressure (about 0.1 MPa). It took approximately 2 to 3 seconds for releasing pressure. The temperature at pressure releasing was 90° C.

After the pressure inside the autoclave had become ordinary pressure, the resulting foamed resin article was taken out and its average cell diameter and average cell density were determined.

Vacuum forming was carried out using the resulting foamed resin article. The results are shown in Table 6.

COMPARATIVE EXAMPLE 8

A foamed resin sheet was prepared in the same manner as that in Example 13 except that a linear low density polyethylene (FZ204-0 manufactured by Sumitomo Chemical Co., Ltd.; MFR=2 g/10 minutes; melting point=124° C.) was used in stead of the linear low density polyethylene used in Example 13 and that impregnation conditions were set as given in Table 5. Vacuum forming was further conducted. The endothermic curve by DSC of the polyethylene used is shown in FIG. 3. The evaluation results are given in Table 6.

TABLE 5

|  | Impregnation pressure (MPa) | Impregnation temperature (° C.) | Impregnation time (h) | DSC temperature difference (° C.) |
| --- | --- | --- | --- | --- |
| Example 13 | 20 | 90 | 2 | 75 |
| Comparative Example 8 | 20 | 110 | 2 | 18 |

TABLE 6

|  | Expansion ratio | Average cell diameter ($\mu$m) | Average cell density (cells/cm$^3$ material) | Secondary workability |
| --- | --- | --- | --- | --- |
| Example 13 | ×10 | 7.5 | $10^{10}$ | 0.01 |
| Comparative Example 8 | ×1.5 | 20 | $10^6$ | 0.5 |

What is claimed is:

1. A foamed resin article characterized by being formed of a polypropylene resin which is a crystalline thermoplastic resin, or a resin composition comprising not less than 50% by weight of a polypropylene resin which is a crystalline thermoplastic resin, and by having an average cell density of not less than $10^{11}$ cells per cubic centimeter (cm$^3$) of said resin or said resin composition.

2. The foamed resin article according to claim 1, wherein an average cell diameter is not greater than 2 $\mu$m.

3. A foamed resin article characterized by being formed of a resin composition comprising 60 to 90 parts by weight of a crystalline thermoplastic resin as an elementary ingredient and 10 to 40 parts by weight of a non-crystalline thermoplastic resin, and by having an average cell density of not less than $10^{11}$ cells per cubic centimeter (cm$^3$) of said resin or said resin composition.

4. The foamed resin article according to claim 3, wherein the non-crystalline thermoplastic resin is a polyolefin-based elastomer.

5. The foamed resin article according to claim 4, wherein the polyolefin-based elastomer is a hydrogenated styrene/butadiene copolymer or a propylene/butene copolymer.

* * * * *